(12) United States Patent
Hammond

(10) Patent No.: US 7,503,265 B1
(45) Date of Patent: Mar. 17, 2009

(54) COOLER TABLE TRAY FOR INSTALLATION AROUND AN UMBRELLA POLE

(76) Inventor: Timothy R. Hammond, 335 Rockwell Ct., Zionsville, IN (US) 46077

( * ) Notice: Subject to any disclaimer, the term of this patent is extended or adjusted under 35 U.S.C. 154(b) by 485 days.

(21) Appl. No.: 11/019,151

(22) Filed: Dec. 22, 2004

(51) Int. Cl.
*A47B 37/00* (2006.01)

(52) U.S. Cl. .......................... 108/50.12; 108/26; 135/16

(58) Field of Classification Search .................. 108/26, 108/25, 50.12, 90, 91, 92; 135/16, 96; 220/575; 206/216
See application file for complete search history.

(56) References Cited

U.S. PATENT DOCUMENTS

| | | | |
|---|---|---|---|
| 1,768,976 A | | 7/1930 | Cuthbertson |
| 2,561,022 A | | 7/1951 | Jones |
| 3,111,095 A | * | 11/1963 | Goodman ..................... 108/26 |
| 3,747,268 A | | 7/1973 | Linder |
| D281,849 S | | 12/1985 | Cantor |
| 4,832,163 A | | 5/1989 | Levesque |
| D301,691 S | | 6/1989 | Mobberley |
| D303,194 S | * | 9/1989 | Darby et al. .................. D7/507 |
| 5,171,077 A | | 12/1992 | Jondahl et al. |
| 5,493,976 A | | 2/1996 | Hammond |
| 5,720,226 A | * | 2/1998 | Padovano ..................... 108/25 |
| 5,732,847 A | * | 3/1998 | Caldi .......................... 220/575 |
| 5,918,411 A | | 7/1999 | Hadrava |
| RE36,262 E | | 8/1999 | Jondahl et al. |
| 5,960,587 A | | 10/1999 | Brasseur, Jr. et al. |
| D418,018 S | | 12/1999 | Winsted |
| 5,996,511 A | * | 12/1999 | Swoger .................. 108/157.13 |
| 6,161,333 A | * | 12/2000 | Poston ........................... 47/86 |
| D453,709 S | | 2/2002 | McCauley |
| 6,434,970 B1 | * | 8/2002 | Hasegawa ................... 62/457.6 |
| D472,146 S | | 3/2003 | Stone et al. |
| D488,741 S | * | 4/2004 | Moya ......................... D11/143 |
| 6,802,263 B1 | * | 10/2004 | Kolb ............................ 108/26 |
| 7,007,813 B2 | * | 3/2006 | Yang ........................ 211/131.1 |
| 7,322,300 B2 | * | 1/2008 | Caeton ......................... 108/90 |
| 7,360,666 B1 | * | 4/2008 | Primel et al. ................. 220/759 |
| 2007/0012223 A1 | * | 1/2007 | Flusche ........................ 108/26 |

* cited by examiner

*Primary Examiner*—José V Chen
(74) *Attorney, Agent, or Firm*—Daniel L. Boots; Matthew R. Schantz; Bingham McHalle, LLP

(57) ABSTRACT

A tray-cooler combination for positioning upon a surface, such as a patio table, about an upwardly extending projection, such as an umbrella pole. The tray-cooler combination includes upper and lower tray members, each having a central aperture, an outer peripheral edge and a radial opening extending between the central aperture and the peripheral edge. The upper tray member may include a plurality of interior compartments for receiving items such as vegetables and dips, condiments, etc. The upper tray member may also be releasably attached to the lower tray member. When joined in combination, the lower tray member can hold ice or other cooling means cool or chill the contents of the upper tray member. Closure members can also be provided to close the radial slots in each tray member to, in combination with the tray member, define the central aperture in which an umbrella pole or the like is received. The connection of the closure members to the tray members is readily released, allowing the slot of each tray member to be opened to permit ready insertion around or removal from the umbrella pole or other upwardly extending like member.

15 Claims, 6 Drawing Sheets

COOLER TABLE TRAY FOR INSTALLATION AROUND AN UMBRELLA POLE

TECHNICAL FIELD OF THE INVENTION

The present invention relates generally to trays, and more particularly to a tray-cooler combination configured for ready installation and use about a projection extending upwardly from a surface, such as an umbrella pole extending up through a table.

BACKGROUND OF THE INVENTION

In certain designs of outdoor patio furniture, a table is provided that includes an umbrella having a pole extending through a hole formed generally through the center portion of the table. Although the umbrella serves a desirable purpose in providing shade for persons using the table, the pole presents an obstacle for placement of food, condiments or other articles at the center of the table, particularly for any access by persons seated about the table.

To overcome this problem, the prior art has proposed trays that include a central opening through which the umbrella pole is received. One such portable tray for attachment to a beach umbrella comprises a solid disc with a central aperture and a pair of collars with set screws for locking onto the pole of the beach umbrella.

Another such prior art tray comprises two pieces forming a tray having a central opening for receiving an umbrella pole. This tray includes two separate half-circle shapes and connecting means for securing the halves together about the umbrella pole. Such trays sometimes include a bearing assembly under the base of the tray to permit its rotation upon the table.

Service trays of the foregoing types have not achieved significant commercial success. Perhaps one reason for this is the fact that it is awkward for these units to be installed upon a table around an umbrella pole. For unitary devices, it is necessary to remove the umbrella pole and then place the large and relatively heavy pole and umbrella assembly through a tight fitting aperture in the service tray. Other devices that provide separable tray elements that can be connected about the pole are not readily transported in disassembled form, nor easily aligned and connected about the pole. Accordingly, there has remained a desire for a tray that is easily disassembled and assembled, thus facilitating both transportation of the tray and convenient installation of the tray about a projection such as an umbrella pole.

Additionally, prior units have not been able to provide a means for keeping perishable food items and beverages cold. Trays of this nature are most frequently used outdoors in warm, sunny environments, where the risk of food spoilage is high. Thus, without a means for cooling the contents of the tray, the amount of time that perishable food could remain outside was limited. Accordingly, there has also remained a desire for a transportable tray that could provide means to keep perishable food items and beverages cold. These and other features and advantages are provided by the present invention.

SUMMARY OF THE INVENTION

A tray-cooler combination is provided that is adapted for use upon a surface, such as a floor surface or patio table, having an upwardly extending projection such as an umbrella pole. The tray-cooler combination generally includes an upper tray member and a lower tray member. The upper and lower members are able to releasably engage each other in a close-tolerance fitting. Both upper and lower tray members have a central opening or aperture, an outer peripheral edge, and a generally radially extending opening extending from the central aperture to the outer peripheral edge and having a sufficient width to receive a pole therein to allow the tray to be positioned about a pole. This invention may further optionally include a closure member to close the radial opening and to fully enclose the pole within the central aperture and impart an integral appearance to the tray. Means may also be provided for releasably securing the closure member to the tray member.

The combined tray and closure member are configured when assembled to provide, as noted above, a central aperture within which an umbrella pole or like device is receivable. In view of the manner of connection of the members, the tray is readily transportable without requiring full disassembly. Also, installation is easily accomplished within the radial opening and, if employed, the closure member can be added to complete the assembly and installation of the tray.

It is an object of the present invention to provide a tray-cooler combination that is adapted for use upon a table or floor surface having an upwardly extending projection such as an umbrella pole.

Further objects and advantages of the present invention will be apparent from the drawings and more detailed description of the preferred embodiment that follows.

DETAILED DESCRIPTION OF THE PREFERRED EMBODIMENT

Figure 1:
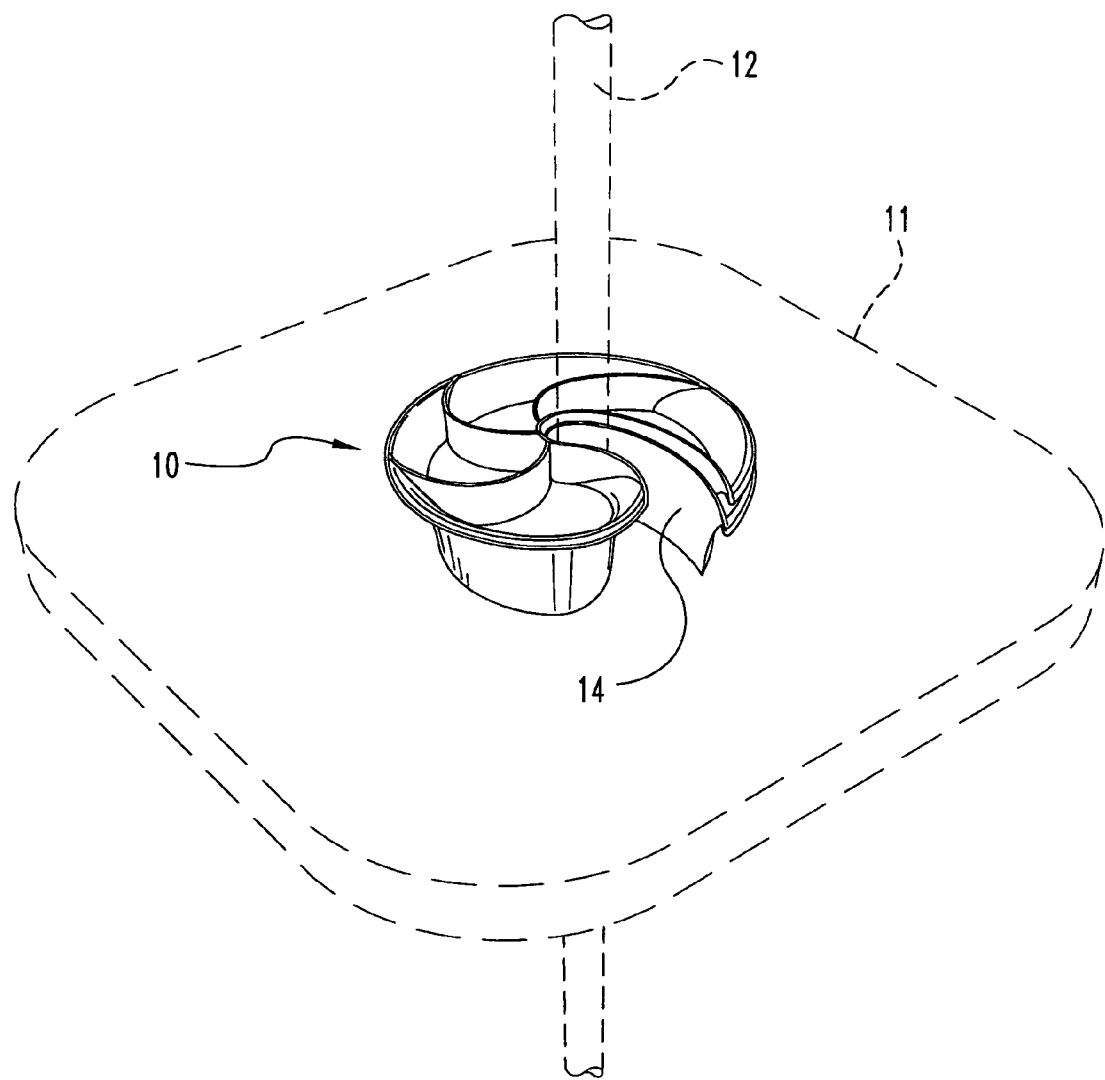
FIG. 1 is a perspective view of a tray-cooler combination according to the present invention shown in use arranged upon a patio table.
Figure 2:
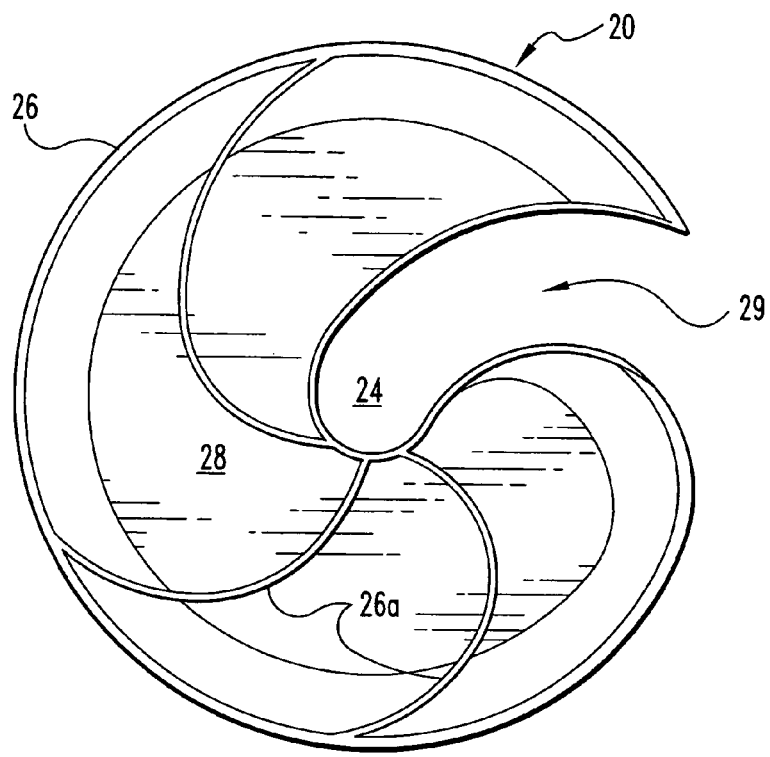
FIG. 2 is a top plan view showing in isolation the upper tray member of the present invention as shown in FIG. 1.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

The present invention provides a tray-cooler combination readily configured for use upon a surface such as a table or floor having a projection extending upwardly therefrom, such as, for example, an umbrella pole. The tray-cooler combination is readily engaged and disengaged from about the umbrella pole, without requiring removal of the umbrella from the table. Further, the tray-cooler combination may be used in connection with a free-standing umbrella that extends directly from a ground surface and that does not require a table surface.

The tray-cooler combination comprises an upper and lower tray member. The upper tray member provides a surface upon which various items, such as condiments and the like, can be placed. For example, the upper tray member may be used to contain food items, including vegetables, crackers, dips, and the like. The upper tray member may alternately be used as a central planter box for flowers and the like. The lower tray member may be used to store ice and serves as the "cooler" portion of the tray-cooler combination. When the upper tray member is placed over the lower tray member, the ice in the lower tray serves to cool or chill the contents of the upper tray. Alternatively, the upper and lower tray member may be used separately. If used in this fashion, the lower tray member may hold canned or bottled beverages, and also may be used as a deep central planter box for flowers and the like if desired.

Referring in particular to the drawings, the tray-cooler combination 10 is shown in FIG. 1 in position upon a table 11 and received about a projection member, such as a pole 12. The tray-cooler combination 10 includes a central opening or aperture 14 within which the pole 12 is received. Central aperture 14 can be sized and shaped in any manner desirable to permit the tray-cooler combination 10 to be received about a projection of varying shapes and sizes that may extend upwardly from a table or other supporting surface. Accordingly, the tray-cooler combination 10 of this invention is not limited to use with an umbrella pole 12, but may be equally suited for use with a variety of objects, and the description herein with respect to an umbrella pole 12 is for purposes of illustration only.

The tray-cooler combination 10 of the preferred embodiment of this invention shown in FIGS. 1-6 includes an upper tray member 20 and lower tray member 30. The upper tray member 20 comprises a central aperture 24, an outer peripheral edge or wall 26, and a radial opening 29 extending therebetween. As shown best in FIGS. 6 and 7A, if desired, a closure member 42 or lid 50 can be provided, as discussed further below, to close radial opening 29. The upper tray member 20 can also include one or more interconnecting interior walls 26a to define one or more interior compartments, such as 28, for receiving items therein. The upper tray member 20 and any closure member 42 fit together to form a preferably annular-shaped tray. Other overall shapes may also be provided by this invention, such as rectangular, hexagonal, or irregularly shaped, or the like.

Figure 3:
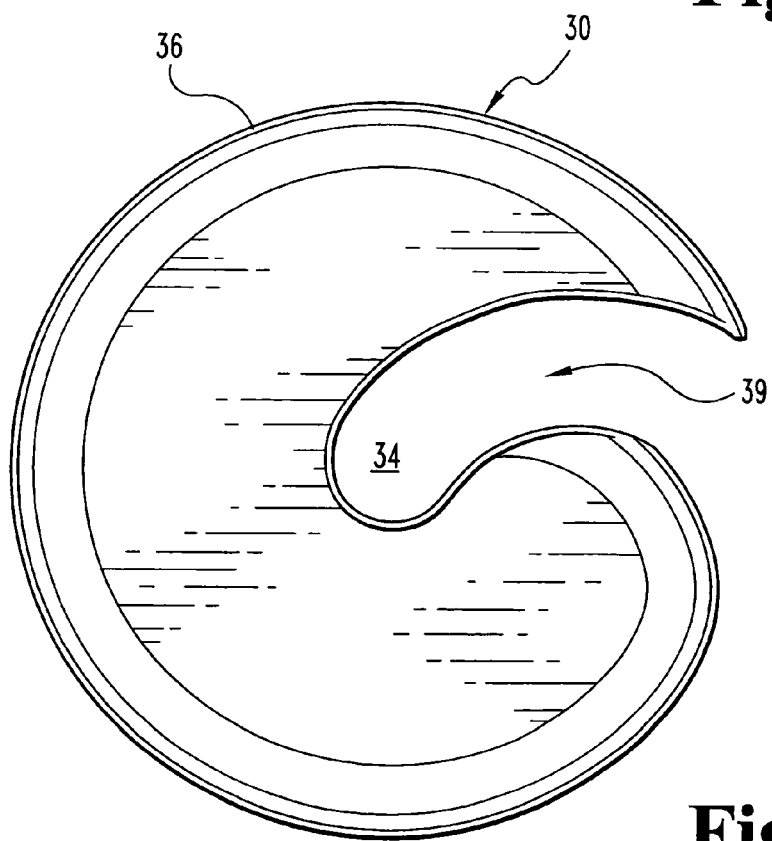
FIG. 3 is a top plan view showing in isolation the lower tray member of the present invention as shown in FIG. 1.
Figure 4:
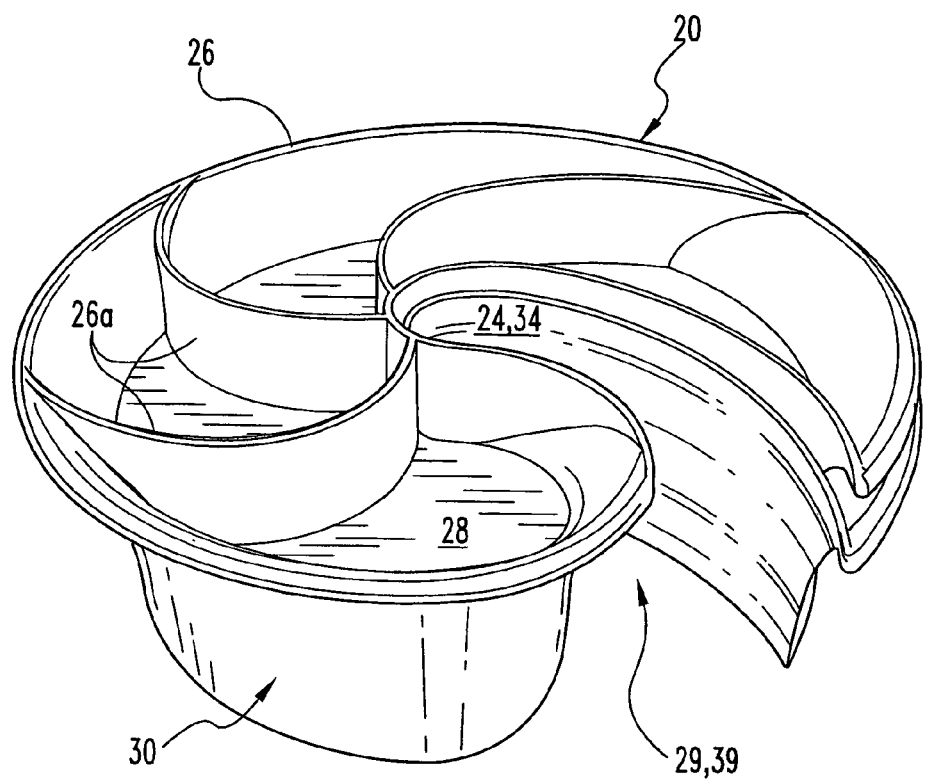
FIG. 4 is a perspective view of the tray-cooler combination according to the present invention as shown in FIG. 1.
Figure 5:
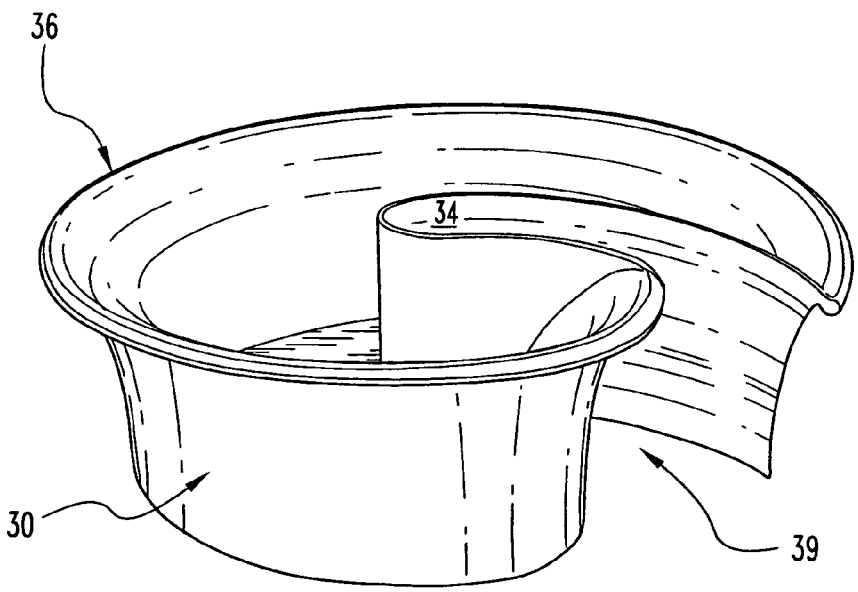
FIG. 5 is a perspective view showing in isolation the lower tray member of the present invention as shown in FIG. 3.

Referring now to FIG. 3, the lower tray member 30 defines a reception cavity and comprises a central aperture 34, an outer peripheral edge or wall 36, and a radial opening 39 extending therebetween. As better shown in FIG. 7B, if desired, a closure member 44 can be provided, as discussed further below, to close radial opening 39. The upper tray member 30 and any closure member 44 fit together to form preferably an annular-shaped tray. Other overall shapes may also be provided by this invention, such as rectangular, hexagonal, or irregularly shaped units.

Figure 7A:
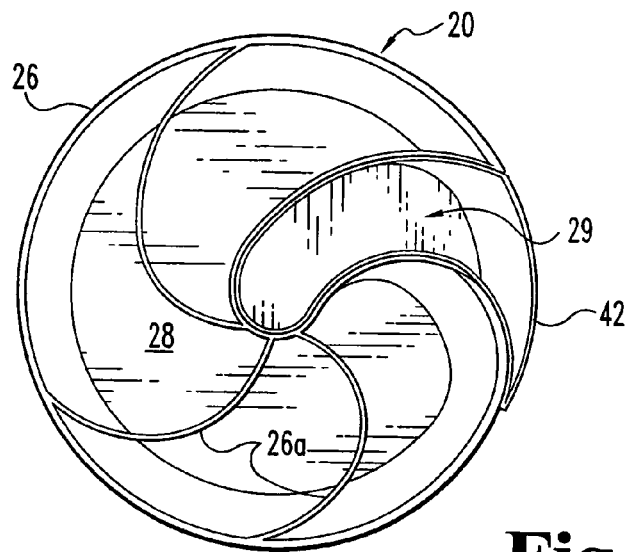
FIG. 7A is a top plan view showing in isolation the upper tray member of the present invention including a closure member releasably attached thereto via an interference fit.

The closure member 42 provided by this invention and shown in FIG. 7A can be releasably joined to the upper tray member 20 by any one of a variety of means. The closure member 44 provided by this invention and shown in FIG. 7B can likewise be releasably joined to the lower tray member 30 by any one of a variety of means.

Figure 7B:
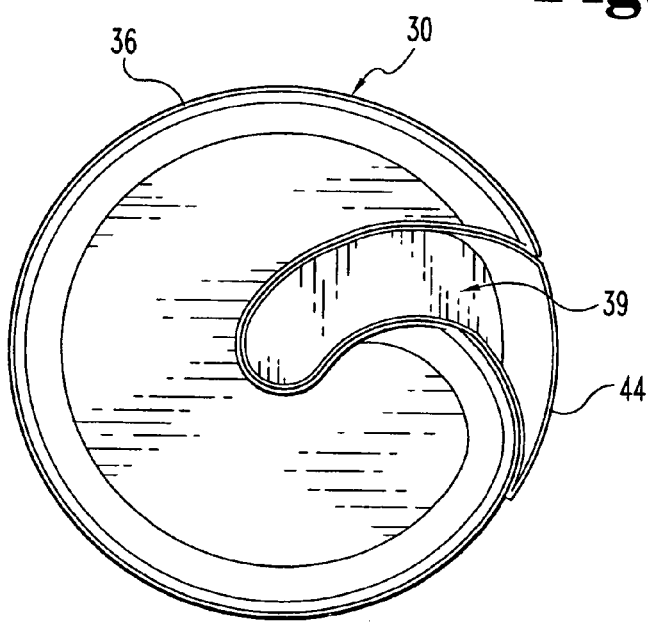
FIG. 7B is a top plan view showing in isolation the lower tray member of the present invention including a closure member releasably attached thereto via an interference fit.
Figure 7C:
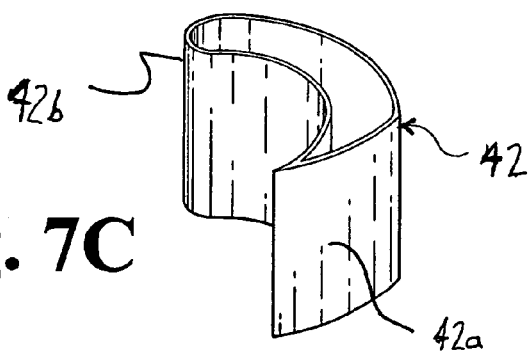
FIG. 7C is a perspective view showing in isolation an embodiment of the closure member.

As noted above, one preferred embodiment of the closure member 42 of the upper tray member 20 is shown in FIGS. 7A and 7C. Such embodiment may be used when the upper tray member 20 is not employed in connection with a projection member 12. As best shown in FIG. 7C, the closure member 42 is defined by a wedge-type article that occupies or fills the radial opening 29 and forms a tray with no central aperture. Closure member 42 has an outer convexly curved portion 42a that defines, when disposed within radial opening 29, an outer surface that completes the outer circular portion of upper tray member 20. Closure member 42 also includes an inner convexly shaped portion 42b that, upon the closure member being disposed within radial opening 29, fills the cavity or void defining central aperture 24, thereby defining a tray member having no central opening.

Figure 8A:
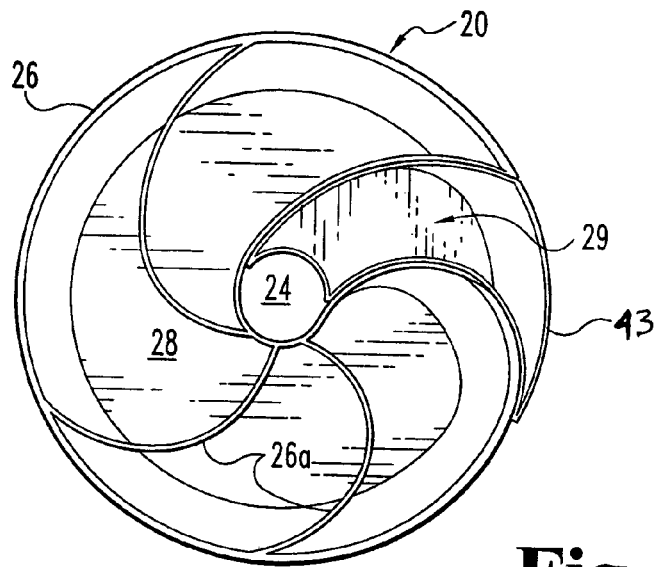
FIG. 8A is a top plan view showing in isolation the upper tray member of the present invention including a closure member releasably attached thereto via an interference fit.
Figure 8B:
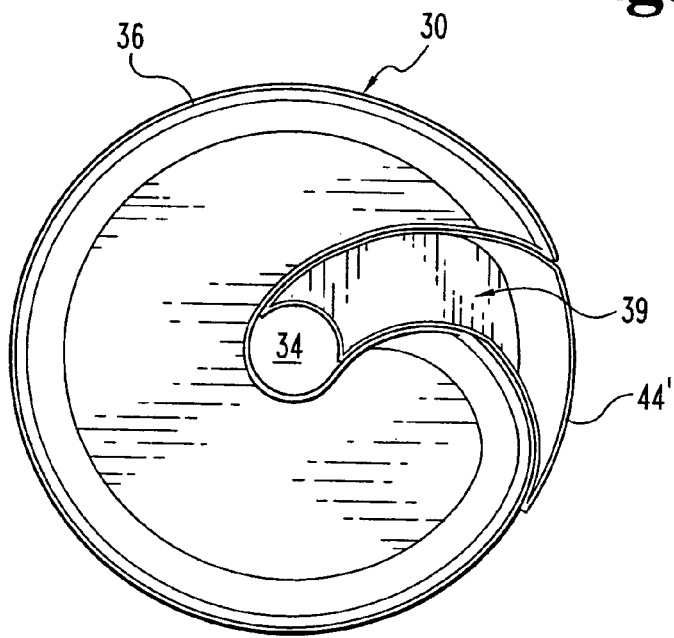
FIG. 8B is a top plan view showing in isolation the lower tray member of the present invention including a closure member releasably attached thereto via an interference fit.
Figure 8C:
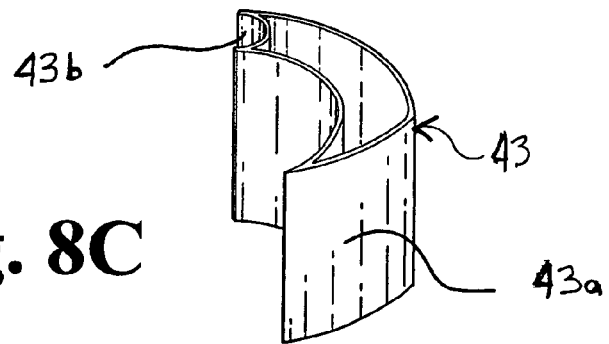
FIG. 8C is a perspective view showing in isolation a second embodiment closure member.

A second preferred embodiment of a closure member 43 is shown in FIGS. 8A and 8C, in which the closure member 43 closes the radial slot 29 while still allowing the upper tray member 20 to receive and be arranged about a projection member 12. As best shown in FIG. 8C, the closure member 43 is defined by a wedge-type article that occupies or fills the radial opening 29 and forms a tray with a central aperture. Closure member 43 has an outer convexly curved portion 43a that defines, when disposed within radial opening 29, an outer surface that completes the outer circular portion of upper tray member 20. Closure member 43 also includes an inner concavely shaped portion 43b that, upon the closure member being disposed within the radial opening, completes the outer periphery of central aperture 24 through which, for example, an umbrella pole may be received.

A first embodiment of closure member 44 for use with the lower tray member 30 is shown in FIG. 7B. Closure member 44 may be removably connected to the lower tray member 30 (such as via an interference fit, with fasteners, or the like) when lower tray member 30 is not engaged with a projection member 12. The closure member 44 fills the radial opening 39 and forms a tray 30 having no central aperture 34. Due to the varying height of the lower tray member 30, closure member 44 will likewise be of varying corresponding height. A second embodiment closure member 44' is shown in FIG. 8B. The closure member 44' engages tray member 30 to close the radial slot 39 while still allowing an aperture 34 therethrough such that the lower tray member 30 may remain engaged about a projection member 12. Due to the varying height of the lower tray member 30, closure member 44' will likewise be of varying corresponding height.

The upper tray member 20 of this invention is preferably readily installed and removed from an umbrella pole 12 or other like projection with minimal effort and no tools required. The upper tray member 20 may be slid relative to the pole 12 such that the pole is received within the radial opening 29 of the tray member 20 and ultimately within the central aperture 24. If a closure member 43 is employed, the closure member 43 may then be secured to the tray member to collectively define the central aperture 24 through which the object, such as the umbrella pole 12, may be received. By providing a slotted tray member 20 and a closure member 43, it is possible to readily open and close the upper tray member 20 with suitable alignment therebetween.

Likewise, the lower tray member 30 may be readily installed and removed from an umbrella pole 12 or other like projection with minimal effort and no tools. The lower tray member 30 may be slid relative to the pole 12 such that the pole 12 is received within the radial opening 39 of the tray member and ultimately within the central aperture 34. If a closure member 44' is employed, the closure member 44' can then be secured to the tray member 30 to collectively define the central aperture 34 through which the object, such as the umbrella pole 12, may be received.

Figure 6:
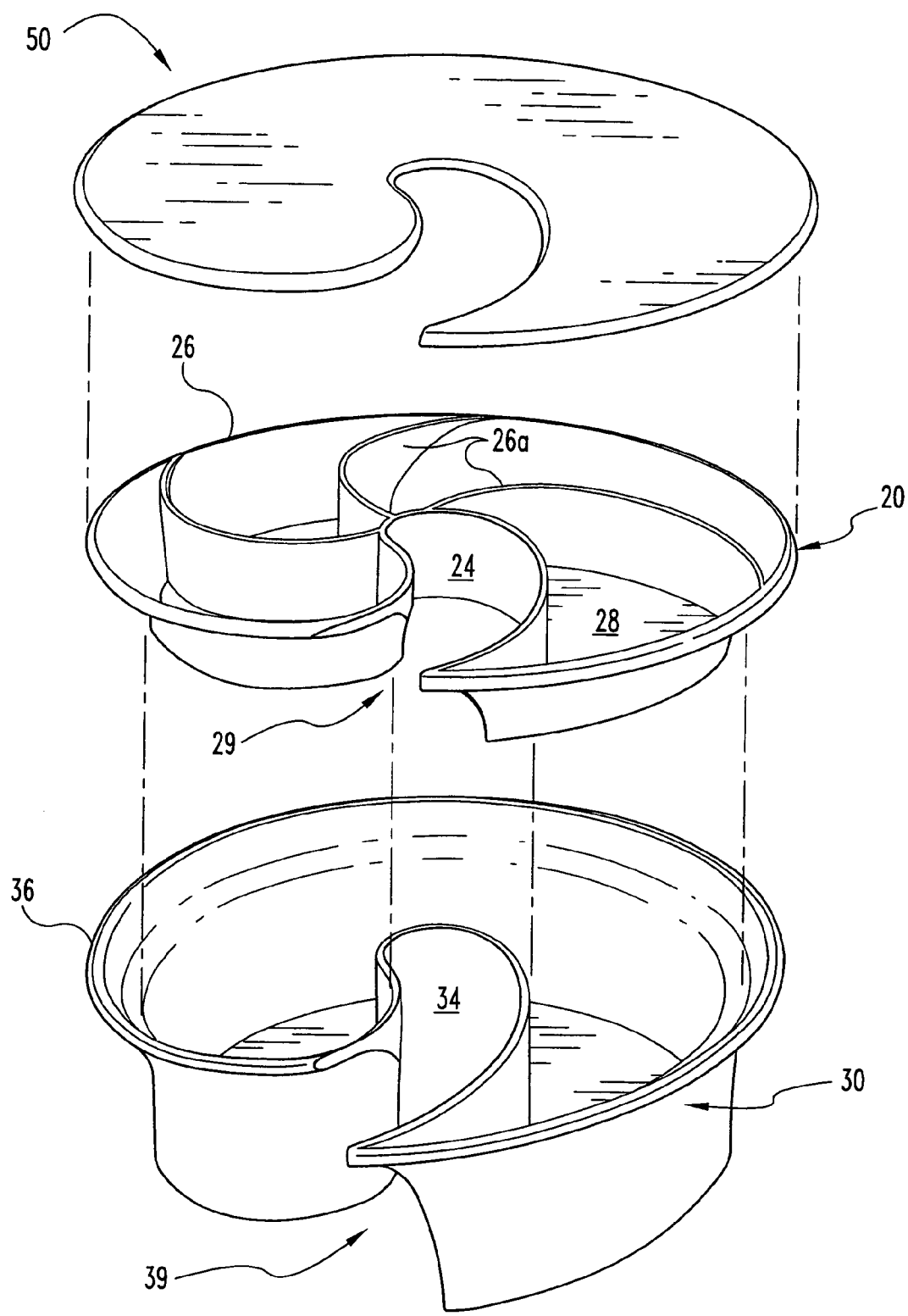
FIG. 6 is an exploded view in perspective of the tray-cooler combination of the present invention equipped with an upper closure member.

As shown in FIG. 6, the upper tray member 20 may be detachably joined to lower tray member 30 in a variety of means preferably about its peripheral edge 26, including snap-fitting edges, tongue-and-groove, or the like. As discussed above, when joined, the lower tray member 30 can hold ice or other cooling means for chilling the contents of the upper tray member 20. When the contents of the upper tray member 20 have been depleted, the upper tray member 20 can be easily detached from the lower tray member 30. Thus, the upper tray member 20 can be moved easily to a kitchen area and restocked without the need to transport the ice-filled lower tray member 30. The entire tray-cooler combination 10 may also be transported within a soft-sided cooler-like carrying case if desired.

The tray-cooler combination 10 of this invention and its component parts may be formed from a variety of suitable structural materials. For example, various hard plastics are well suited to making up the tray components, which then can be conveniently molded in the forms shown. Other structural materials, such as aluminum or the like, may also be used as desired.

In one contemplated embodiment of the present invention, a pair of flexible or elastomeric flanges (not shown) are aligned with and fixedly secured to the opposing interior surfaces of the radial slot opening 29. The flanges are adapted, when the upper tray member 20 is moved to receive a pole within the radial slot or to remove the pole from the central opening of the tray member 20, to engage the pole and flex out of the path of the pole to allow the pole to pass through the radial slot and to flex back to a stationary position once the pole has cleared the radial slot.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A container, comprising in combination:
   a lower tray member, further comprising:
      a central aperture;
      a peripheral edge defining a plane; and
      a generally radial slot extending between the central aperture and the peripheral edge of said lower tray member, said radial slot defining a spiral curve in the plane of the peripheral edge; and
   an upper tray member, further comprising:
      a central aperture;
      a peripheral edge defining a plane; and
      a radial slot extending between the central aperture and the peripheral edge of said upper tray member, the radial slot defining a spiral curve in the plane of the peripheral edge;
   wherein the upper tray is inserted into the lower tray, thereby aligning their respective radial slots; and
   wherein said lower tray has a bottom portion and a sidewall extending between the bottom portion and the peripheral edge to define a storage volume.

2. The combination as in claim 1 further comprising a top engaged with said upper tray member, said top having a central opening through which an upwardly extending elongated member is positioned, a peripheral edge and a radial opening extending from said central opening to said peripheral edge, said radial opening having a sufficient width to receive therethrough the upwardly extending elongated member, said top enabling removal of the upwardly extending elongated member from said central opening through said radial opening.

3. The combination as in claim 1 further comprising a closure member for closing the radial opening and thereby defining, in combination with said lower tray member, a central aperture within which an upwardly extending elongated member is received;
   wherein said closure member is movable between
      a first position without said radial opening to permit insertion of the pole into said radial opening and
      a second position within the radial opening such that said radial opening is filled by the closure member.

4. The combination as in claim 3 wherein said closure member includes means for releasably securing the closure member in a closed position within said radial opening.

5. The combination as in claim 3 wherein said closure member includes a means for releasably attaching said closure member to said lower tray member, said lower tray member enabling removal and insertion of the upwardly extending elongated member through said radial opening, said lower tray member and said closure member, when connected together, defining the central aperture within which the upwardly extending elongated member is received.

6. The combination of claim 1 further comprising an upwardly extending elongated member through the central apertures of the upper and lower tray members; wherein said radial slot is of sufficient width to receive therethrough the upwardly extending elongated member; said combination enabling insertion of said elongated member through said radial slot from said central apertures of said upper and lower tray members to allow said combination to be positioned about said upwardly extending member.

7. The combination as in claim 1 wherein said upper tray member further comprises a closure member for closing said radial slot to thereby define, in combination with the upper tray, member a central aperture through which said upwardly extending member extends, whereby said closure member and said upper tray member collectively provide the appearance of an integral tray.

8. The combination as in claim 7 wherein the closure member of said upper tray member comprises a separable element releasably attached to said upper tray member.

9. The combination as in claim 1 wherein the upwardly extending elongated member is an umbrella pole.

10. The combination as in claim 1 further comprising a top removably attached to said upper tray member.

11. The combination as in claim 1 further comprising a peripheral vertical sidewall and one or more interconnecting interior walls to define within the interior of said upper tray member at least two compartments for receiving items therein.

12. The combination as in claim 1 wherein said lower tray member further comprises a closure member for closing said radial slot to thereby define in combination with the lower tray member a central aperture within which an elongated member may be received, whereby said closure member and said upper tray member collectively provide the appearance of an integral tray when assembled.

13. The combination as in claim 12 wherein said closure member comprises a separable element releasably attached to said lower tray member.

14. The combination as in claim 12 wherein said closure member is attached to said lower tray member.

15. The combination as in claim 12 including cooling means disposed in said lower tray member.

* * * * *

UNITED STATES PATENT AND TRADEMARK OFFICE
CERTIFICATE OF CORRECTION

| | |
|---|---|
| PATENT NO. | : 7,503,265 B1 |
| APPLICATION NO. | : 11/019151 |
| DATED | : March 17, 2009 |
| INVENTOR(S) | : Timothy R. Hammond |

Page 1 of 1

It is certified that error appears in the above-identified patent and that said Letters Patent is hereby corrected as shown below:

On the title page, second line of item (74), please delete "McHalle" and insert --McHale--.

With regards to the pendency of claim 7, column 6, line 34, please delete "1" and insert in lieu thereof --6--.

With regards to the pendency of claim 9, column 6, line 64, please delete "1" and insert in lieu thereof --6--.

Signed and Sealed this

Nineteenth Day of May, 2009

JOHN DOLL
*Acting Director of the United States Patent and Trademark Office*